Patented Oct. 17, 1933

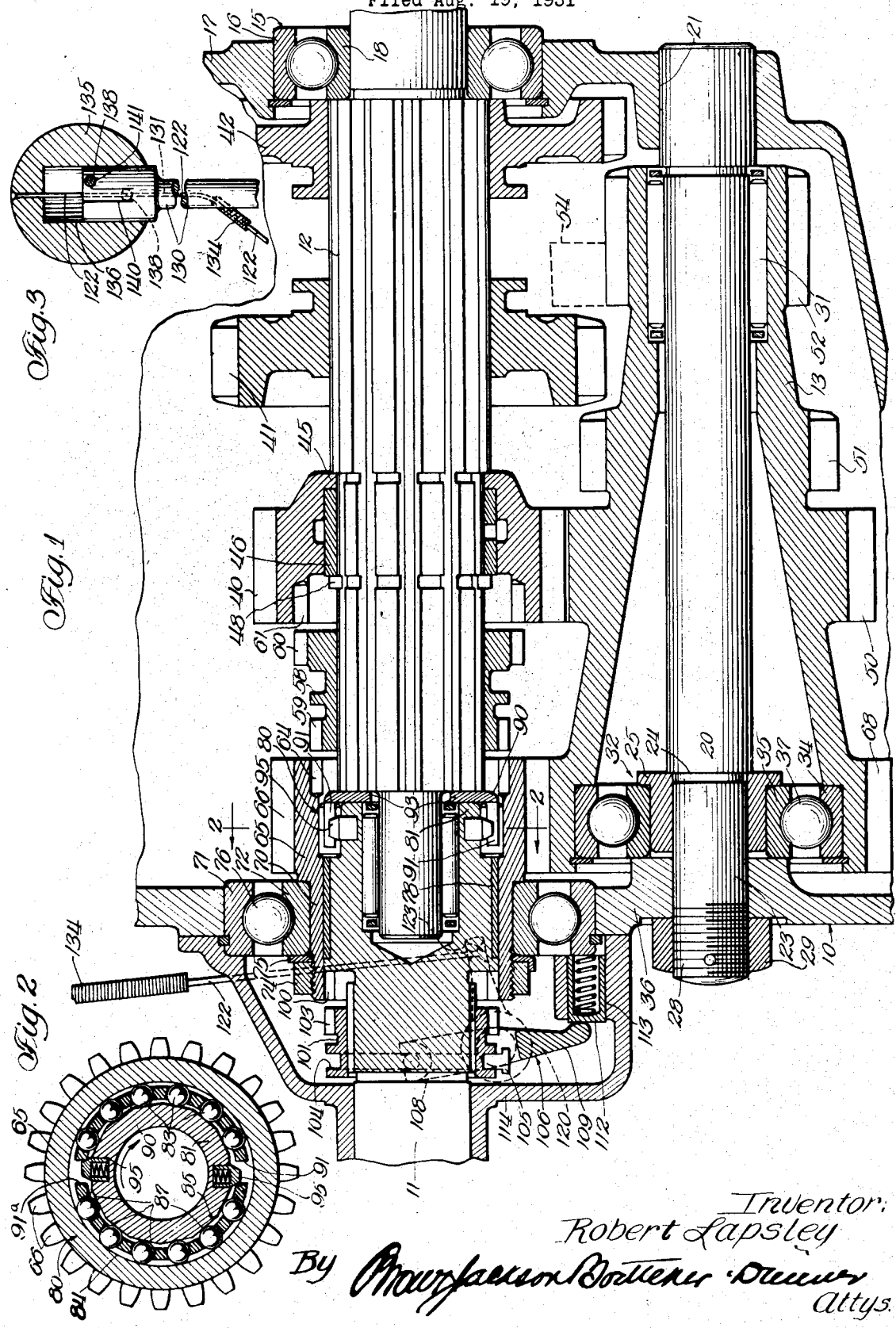

1,931,260

UNITED STATES PATENT OFFICE 1,931,260

TRANSMISSION

Robert Lapsley, Buchanan, Mich., assignor to Clark Equipment Company, Buchanan, Mich., a corporation of Michigan Application August 19, 1931. Serial No. 558,010

6 Claims. (Cl. 74—57)

The present invention relates generally to transmissions for automobile vehicles and the like, and more particularly to transmissions of the type which includes some form of overrunning clutch provided for the purpose of allowing certain rotating parts of the transmission to overrun other and usually the driving parts to allow the vehicle to coast without disengaging the conventional clutch mounted forward of the transmission.

The advantages of this type of transmission are generally recognized since a material saving in gasoline consumption is had and a reduction of vibration and the like is realized where the vehicle can coast at driving speeds while the motor of the vehicle is allowed to idle, it being connected so as to be instantly available to apply driving power to the propelling wheels of the car.

Nevertheless, under many conditions, particularly when descending a steep decline, it is desirable to be able to utilize the resistance of the motor as a brake, in which case the overrunning clutch connections must be rendered inactive without subjecting the transmission to shock loads when rendering inactive the overruning clutch. Further, many operators prefer to dispense with the overrunning clutch feature so as to utilize the motor as a brake at all times.

According to the present invention the free wheel clutch is disposed within the transmission main drive gear or what is often termed the high speed pinion. This simplifies the construction greatly as it requires a minimum departure from conventional design and permits of inexpensive manufacture, simple assembly and maximum utility of the material involved. The torque upon the free wheel clutch is never more than engine torque. This also permits the free wheel clutch to operate upon reverse which is a desirable feature.

A further feature of improvement is the provision of a lockout mechanism which is inexpensive and simple. Also it is conveniently operable by any one of a variety of control means which simplifies the actuation thereof.

Other objects and advantages of the present invention will be apparent to those skilled in the art after a consideration of the following detailed description, taken in conjunction with the accompanying drawing in which:

Figure 1 is a vertical longitudinal section taken through a transmission embodying the principles of the present invention;

Figure 2 is a cross sectional view taken substantially along the line 2—2 of Figure 1; and Figure 3 is a view, partly in section and partly in elevation, illustrating one form of manually operated control means for the overrunning clutch of the transmission shown in Figure 1.

Referring now more particularly to Figure 1, the reference numeral 10 indicates in its entirety a transmission housing in which a driving shaft 11, a driven shaft 12 and a countershaft 13 are journaled. The present invention is not primarily concerned with specific details of the transmission per se, it being sufficient to note for the purposes of this disclosure that the transmission shown in Figure 1 embodies many of the features described and claimed in my copending application, Serial No. 512,596, Transmission, filed January 31, 1931 (Case 6), to which reference may be had for further details.

For the purposes, therefore, of the present invention it may be considered that the transmission shown in Figure 1 is a conventional helical gear four speed and reverse transmission as regards the gears and shift layout. The rear end of the driven shaft 12 is supported in the rear end of the housing 10 by anti-friction bearings 15, one race 16 of which is carried in the rear wall 17 of the housing while the other race 18 is secured to the rear end of the driven shaft 12. The countershaft or tubular lay shaft 13 is journaled for rotation upon a fixed shaft 20 having its rear end received within a suitable formed opening 21 in the rear wall 17. The forward end of the fixed shaft 20 is reduced, as at 23, forming a shoulder 24 which abuts against a flanged collar 25. The forward end of the fixed shaft is threaded, as at 28, and receives a nut 29 by which the fixed shaft may be secured in place. Bearing means 31 supports the rear end of the tubular lay shaft 13 on the fixed shaft 20, and ball bearing means 32 supports the front end of the countershaft 13 on the front end of the fixed shaft 20. The ball bearing means 32 includes an outer race 34 secured to the tubular lay shaft and an inner race 35 clamped between the flanged end of the collar 25 and the forward transverse wall 36 of the transmission housing 10. Anti-friction balls 37 are positioned between the inner and outer races and are operative to prevent axial movement of one race with respect to the other.

The driven shaft 12 is splined substantially throughout its length and a number of gears 40, 41 and 42 are mounted thereon, the latter two gears being slidable on the driven shaft 12, while the gear 40 is freely rotatable thereon but held from axial displacement with respect thereto by virtue of an inwardly directed flange or shoulder 45 held in abutting relation with respect to the ends of the splines on the larger end of the driven shaft 12 by a cylindrical bushing 46, the latter being held in place by a notched ring 48 as clearly disclosed in the copending application referred to above. The countershaft 20 includes gears 50, 51 and 52 in mesh, respectively, with the gears 40, 41 and 42 on the driven shaft 12. The gear 41 is adapted to mesh with the gear 51 on the countershaft or the gear 54 which is in the form of a reverse idler driven from the smallest gear 52 on the countershaft 13. The floating gear 40 is adapted to be connected with the driven shaft 12 by means of a sliding clutch dog 58 having two sets of teeth 59 and 60, the latter teeth being adapted to engage internal teeth 61 formed on the gear 40. When the teeth 60 and 61 are engaged the gear 40 is connected with the driven shaft 12 to drive the same. The teeth 59 are arranged to engage internal teeth 64 formed on the driving gear 65 which is freely rotatable on the driving shaft 11 as will now be described in detail.

The driving gear 65 includes teeth 66 engageable with the teeth formed on the driving gear 68 for the countershaft 13. The driving gear 65 is also provided with a forwardly extending hub portion 70 which passes through the transverse wall 36 of the housing and is journaled thereon by a ball bearing structure including an outer race 71 secured to the transverse wall 36, an inner race 72 clamped to the driving gear 65 by means of a nut 74 and a lock washer 75, and a series of anti-friction balls 76 which are arranged to take both radial and axial loads, just as the bearings 15 and 32 take both radial and axial loads. The forward end of the hub 70 is threaded to receive the nut 74. A cylindrical bushing member 78 is interposed between the driving gear 65 and the associated driving shaft 11 and is in abutting relation with a flange formed on the driving shaft 11 (see Fig. 1).

An overrunning clutch connection, indicated in its entirety by the reference numeral 80, is disposed between the rear end 81 of the driving shaft 11 and the rear portion of the driving gear 65. The overrunning clutch 80 is of the type embodying a plurality of rolls or rollers 83 acting between a substantially cylindrical surface 84 formed on the inside of the gear 65 and a concentric surface 85 formed on the rear end 81 of the driving shaft 11. The latter surface is not cylindrical but is formed to present a plurality of substantially flat circumferentially disposed cam sections 87. The locking rollers 83 are preferably arranged so as to lie opposite the cam sections or flats, and the rolls 83 are maintained in this spaced relationship by means of a spacing cage 90 provided with a peripheral flange portion which is slotted, as at 91 (Figure 1), to accommodate the various rollers 83. The spacing member 90 is formed with a radially inwardly directed disc-like flange 93 which, as best shown in Figure 1, is received between and serves to space the adjacent ends of the driving and driven shafts 11 and 12. The locking rollers 83 abut at their rear ends against the flange 93, and at their forward ends they abut against the bushing 78 and thus serve to hold the latter up against the flange on the driving shaft 11, preventing it from shifting rearwardly relative thereto.

The spacing cage 90 containing the locking rollers 83 is urged in one direction by means of a pair of alternate diametrically opposed spring pressed plungers 95 carried by the driving shaft 11 at the rear end 81 thereof, this member also serving as the driving member of the overrunning clutch 80. Since the flat sections 87 on the inner member 81 of the overrunning clutch will, if extended, intersect the adjacent surface 84 of the concentric driving gear 65, the tendency for the spring pressed plungers is to move all of the rolls 83 into clamping or wedging engagement with the driving gear 65 and the driving shaft 11 whereby driving power may be transmitted from the latter to the former. The heads of the spring pressed plungers 95 are inclined or beveled so as to properly bias the cage 90, and the heads engage within slots 91a from which the corresponding rolls have been omitted, see Figure 2. It will also be observed that the presence of the spring pressed plungers 95 also serves as a means to positively prevent the cage 90 from bringing the locking rolls any farther than a central position on the cam or flat sections 87. Thus, rotation of the driving shaft 11 in the direction of the arrow, shown in Figure 2, will wedge the rolls 83 into clamping engagement with the driving gear 65, but should the driving gear 65 be rotated in the same direction at a speed greater than that with which the driving shaft 11 is rotated the rolls 83 will allow the driving gear 65 to overrun the driving shaft 11.

As pointed out above, where a transmission is provided with some form of overrunning clutch it is necessary to provide means for locking out the overrunning clutch without subjecting the transmission to shock loads so that, where necessary, the motor of the vehicle may be used as a brake to retard the speed thereof. The means to this end which I have provided is best shown in Figure 1. The forwardmost end of the driving gear 65 is provided with a plurality of internal teeth 100 spaced around the interior of the forward hub portion 70, adjacent the flange on the driving shaft 11. Thus, the gear 65 is prevented from shifting rearwardly relative to the driving shaft 11. The adjacent section of the driving shaft 11 is splined and slidably receives a collar 101 thereon. This collar is provided with a plurality of external teeth 103 adapter to engage with the teeth 100 formed on the driving gear 65, and the collar 101 also carries a grooved flange 104 for the purpose of accommodating a throw-out or thrust collar 105 which is pivotally connected to be actuated by a yoke 106. The yoke 106 is pivotally mounted for swinging movement about a transverse axis on the housing 10 and includes a pair of arms 108 actuating the throw-out collar 105 and a depending portion 109 which has its lower end in engagement with a spring pressed plunger 112 slidably mounted in a boss 113 carried in the journal housing 114 in which the driving shaft 11 is journaled and which is securely bolted or otherwise secured to the forward or transverse wall 36 of the transmission housing 10. As best shown in Figure 1, the spring pressed plunger 112 serves to bias the sliding collar 101 toward engagement with the forward end of the driving gear 65 which is forward of the transverse wall 36. The ends of the clutching teeth are cut on a slant so that if the gear 65 is turning in relation to the shaft 11, the teeth will not engage, merely ratcheting against each other, until the driver, by use of the engine throttle or wheel brakes, causes these two parts to turn at nearly the same speed, which results in no relative rotation between them, at which instant these two parts will then snap together without shock to the transmission. While the driving gear 65 and the driving shaft 11 are clutched together the overrunning clutch 80 is locked out and rendered inoperative to permit the driving gear 65 to overrun the driving shaft 11.

It is necessary, therefore, to provide means for holding the sliding collar 101 forward on the driving shaft 11 and out of engagement with the teeth 100 on the forward end of the driving gear 65. The means as provided to this end includes an arm 120 connected in any manner desired to the yoke 106 and operative to swing the same about its pivotal support. The outer end of the arm 120 is provided with a suitable recess and aperture receiving the lower end of an operating wire 122 the lower end of which fixedly carries a suitable abutment 123 received within the recess.

The control wire 122 may be actuated by any type of control, such as the draw rod construction shown in either Figure 5 or Figure 12 of my copending application, Serial No. 512,595, Coaster device, filed January 31, 1931, or any other type of control which may be located upon the instrument board or at any other convenient position accessible to the driver. As illustrative of such controls, Figure 3 shows a type of control which may be utilized if desired. The part 130 in Figure 3 represents some part of the automobile, such as the upper end of the shift lever or a support fixed to the car. For the purposes of this structure it will be considered that the part 130 is the upper end of a gear shift lever or rod. The rod 130 is provided with a substantially axial bore 131 through which the control wire 122 extends. The bore 131 is enlarged, to provide space to permit the wire 122 to emerge from the rod 130 and also to provide space to receive the casing surrounding the control rod or wire 122 such as the casing of a Bowden cable. Slidably and rotatably mounted on the upper end of the gear shift rod is a knob or handle 135 having a bore 136 accommodating the upper end of the gear shift rod. The knob 135 receives and is fixedly secured to the upper end of the control rod 122. At a point on its interior wall the bore 136 carries a pin or stud 138 which is adapted to project within a slot 140 formed in the upper end of the rod 130. The slot 140 includes a lateral extension to receive and retain the stud 138 so as to hold the knob 135 in an upper position which corresponds to the position in which the control wire 122 holds the slidable collar 101 in the position shown in Figure 1 in which the spring pressed plunger is pressed inwardly. Instead of the form of operating knob shown a notched bar may be extended through a plate the notch hooking over the plate to hold the clutch 101 out of engagement.

When it is desired to lock out the overrunning clutch all that is necessary to do in the form illustrated is to give the knob 135 a slight clockwise rotation which frees the pin 138 from the shelf 140 whereupon the spring pressed plunger 112 is effective to withdraw the control wire 122 and to move the knob 135 downwardly along the rod or support 130 whereupon the pin 138 carried by the knob 135 takes a position in the lower end of the slot 140. The knob 135 is thus movable to two positions for the purpose of controlling the overrunning clutch, one position being that shown in full lines in Figure 3 where the collar 101 is held away from the forward end of the driving gear 65, and the second position being that in which the knob 135 takes a lower position, as shown in dotted lines in Figure 3 with the stud 138 in the bottom of the slot 140. Instead of depending upon the spring plunger 112 to throw the clutch 101 into engagement it may if desired be moved positively by the Bowden cable in either direction, the spring actuation for engagement being more desirable because it gives a quick but yielding selective action, whereas positive movement might be blocked by clash of the engaging teeth, or should they engage, cause severe shock loads to the transmission.

While I have shown and described in detail the preferred structural embodiment of my invention, it is to be understood that my invention is not to be limited to the specific means shown and described but that widely different means may be employed in the practice of the broader aspects of my invention. Details may be modified and used in different combinations to suit a given purpose without introducing novelty over what I have disclosed. I have made no attempt in this specification to show structural variations with a view of exhausting the possibilities which the present invention presents, but I am aware of these possibilities and intend to use and exploit the invention in all such forms and embodiments as may fall within the scope and meaning of the following claims.

What I claim, therefore, and desire to secure by Letters Patent is:

1. In a transmission, a housing having a transverse wall, a driving gear journaled in said transverse wall, a driving shaft journaled in said driving gear, said gear being freely rotatable on said shaft, bearing means carried by said transverse wall for supporting said gear and the adjacent end of the driving shaft, means in the housing driven from said gear, an overrunning clutch connection between said driving gear and said driving shaft and disposed wholly within said housing inside of the transverse wall thereof, and means disposed outside said transverse wall for controlling said overrunning clutch connection.

2. A transmission comprising, in combination, a housing having a transverse wall, a driving shaft, a driving gear freely rotatable on said shaft and journaled in said transverse wall, means in the housing driven from said driving gear, an overrunning clutch connection between said driving shaft and said driving gear on one side of said wall, and lockout means for rendering said overrunning clutch inactive and positioned on the other side of the transverse wall.

3. In a transmission, a housing having a transverse wall, a driving shaft journaled in said housing, a driving gear journaled for free rotation on the rear end of said driving shaft and having gear teeth disposed within the housing, bearing means supporting said driving gear and the rear end of said driving shaft on said transverse wall, means in the housing driven from said driving gear including a driven shaft journaled in the rear end of said driving shaft, an overrunning clutch connection between the rear ends of the driving gear and the driving shaft and disposed in the plane of the gear teeth of said driving gear and radially outwardly of the forward end of said driven shaft, and means for controlling said overrunning clutch connection.

4. In a transmission, a pair of driving and driven shafts coaxially disposed and rotatable with respect to one another, a freely rotatable driving gear journaled on the driving shaft, said driving gear having a plurality of internal teeth, a circumferentially disposed shoulder formed on the driving shaft and adapted to abut against said internal teeth to prevent axial movement of the driving gear relative to the driving shaft in one direction, a journal bushing inserted between the driving gear and the driving shaft in a direction opposite to said first direction, an overrunning clutch connection arranged in rear of said bushing and adapted to cause the driving shaft to drive said driving gear in one direction, said overrunning clutch connection comprising a plurality of locking rolls which abut against said journal bushing to hold the same against said shoulder.

5. In a transmission, a pair of driving and driven shafts arranged in axial alignment, one of said shafts including a reduced end received by and journaled in the adjacent end of the other shaft, a driving gear freely rotatable on one of the shafts, and an overrunning clutch interposed between the last named shaft and the driving gear and including a plurality of locking rolls and a retainer for the rolls, both the rolls and retainer being disposed radially outwardly of said reduced end, the retainer including a radially inwardly directed portion positioned between adjacent ends of said shafts and arranged to space said shafts apart.

6. In a transmission, a housing having a transverse wall, driving and driven shafts journaled in said housing in axial alignment, a driving gear freely rotatable on the driving shaft, bearing means mounting the driving gear for rotation on the transverse wall, a circumferential shoulder on the driving shaft and cooperating with the driving gear to restrain the driving shaft from moving forwardly relative to the driving gear, a cylindrical bushing interposed between said driving gear and the driving shaft adjacent said bearing means, overrunning clutch means between the driving gear and the rear end of said driving shaft and including a plurality of locking elements and a spacing cage therefor, and means to prevent rearward movement of the driving shaft relative to the driving gear comprising a central apertured disc section carried by said cage and interposed between adjacent ends of the driving and driven shafts.

ROBERT LAPSLEY.